United States Patent
Danabalan et al.

(10) Patent No.: US 8,938,991 B2
(45) Date of Patent: Jan. 27, 2015

(54) METHOD OF MAKING A MOLDED GLASS ARTICLE

(75) Inventors: Vignesh Danabalan, Charlotte, NC (US); William Pierson Hart, Cornelius, NC (US); Michael A. Zarkis, Huntersville, NC (US); James Dondero, Millville, NJ (US)

(73) Assignee: Rubbermaid Incorporated, Huntersville, NC (US)

( * ) Notice: Subject to any disclaimer, the term of this patent is extended or adjusted under 35 U.S.C. 154(b) by 93 days.

(21) Appl. No.: 13/252,537

(22) Filed: Oct. 4, 2011

(65) Prior Publication Data

US 2013/0081427 A1    Apr. 4, 2013

(51) Int. Cl.
| | |
|---|---|
| C03B 11/10 | (2006.01) |
| C03B 40/02 | (2006.01) |
| C03B 11/02 | (2006.01) |
| C03B 11/12 | (2006.01) |
| C03B 27/06 | (2006.01) |
| C03B 29/02 | (2006.01) |

(52) U.S. Cl.
CPC ............... C03B 11/10 (2013.01); C03B 40/02 (2013.01); C03B 11/02 (2013.01); C03B 11/127 (2013.01); C03B 27/06 (2013.01); C03B 29/02 (2013.01)
USPC .................................................. 65/68; 65/82

(58) Field of Classification Search
CPC ........ C03B 27/06; C03B 11/02; C03B 11/10; C03B 32/02; B65D 1/40; B65D 25/14; B65D 5/4216
USPC ...................................... 65/24, 66, 72, 82–85
See application file for complete search history.

(56) References Cited

U.S. PATENT DOCUMENTS

| | | | | |
|---|---|---|---|---|
| 2,572,511 | A * | 10/1951 | Palmqvist | 65/71 |
| 3,404,974 | A * | 10/1968 | Arieh Carmi et al. | 65/319 |
| 3,788,829 | A * | 1/1974 | Miner et al. | 65/79 |
| 4,032,317 | A * | 6/1977 | Carmi et al. | 65/161 |
| 4,059,429 | A * | 11/1977 | Carmi et al. | 65/355 |
| 4,140,512 | A * | 2/1979 | Carmi et al. | 65/319 |
| 4,264,350 | A * | 4/1981 | Thomas | 65/26 |
| 4,333,756 | A * | 6/1982 | Seeman | 65/25.1 |
| 4,840,656 | A * | 6/1989 | Ziegler et al. | 65/85 |
| 5,013,348 | A * | 5/1991 | Hirota | 65/102 |
| 5,322,542 | A * | 6/1994 | Ogata et al. | 65/102 |
| 5,676,721 | A * | 10/1997 | Fredholm et al. | 65/68 |
| 5,888,266 | A * | 3/1999 | Eagle et al. | 65/169 |
| 7,377,477 | B2 * | 5/2008 | Lucek et al. | 249/114.1 |
| 7,644,596 | B2 * | 1/2010 | Ookahara et al. | 65/61 |
| 2003/0090024 | A1* | 5/2003 | Skov et al. | 264/157 |
| 2004/0231363 | A1* | 11/2004 | Monden et al. | 65/77 |
| 2006/0174654 | A1* | 8/2006 | Penrith | 65/56 |
| 2007/0187277 | A1* | 8/2007 | Furlong | 206/515 |

(Continued)

OTHER PUBLICATIONS

United States Patent and Trademark Office, Vignesh Danabalan, U.S. Appl. No. 13/252,550, filed Oct. 4, 2011.

*Primary Examiner* — Jodi C Franklin
(74) *Attorney, Agent, or Firm* — Dennis J. Williamson; Moore & Van Allen PLLC

(57) ABSTRACT

A method of making a glass container comprising providing a mold defining an article having a base at a bottom of the mold cavity where the mold cavity comprises an undercut portion that defines a recess in the mold cavity; introducing molten glass to the mold; cooling the glass to cause the glass to shrink a sufficient amount that the protuberance recedes from the recess; and removing the container from the mold in a linear direction.

13 Claims, 10 Drawing Sheets

(56) References Cited

U.S. PATENT DOCUMENTS

| | | | |
|---|---|---|---|
| 2008/0041582 A1* | 2/2008 | Saetre et al. | 166/205 |
| 2008/0041852 A1 | 2/2008 | Cai | |
| 2009/0173656 A1* | 7/2009 | Furlong | 206/508 |
| 2010/0176022 A1* | 7/2010 | Furlong | 206/508 |

* cited by examiner

METHOD OF MAKING A MOLDED GLASS ARTICLE

BACKGROUND

The invention relates generally to molded glass articles such as containers and, more specifically, to the molding of undercut areas on a molded glass article.

SUMMARY

A method of making a glass article comprises the steps of providing a mold having a mold cavity defining an article where the mold cavity comprises an undercut portion that defines a recess in the mold cavity; introducing molten glass to the mold such that the glass fills the recess of the undercut portion to create a protuberance on the article; cooling the glass to cause the glass to shrink a sufficient amount that the protuberance withdraws from the recess; and removing the article from the mold in a linear upward direction.

The process may further comprise the step of lubricating the mold cavity before each step of introducing molten glass. The process may further comprise the step of flame treating the article without distorting the protuberance. The distance the protuberance extends beyond the side wall of the article may be less than 1 mm and approximately 0.25 mm. The step of cooling may comprise running coolant over the mold in the area adjacent to the base and recess. The coolant may comprise air. The step of cooling may comprise adequately running coolant over the mold. The process may further comprise the step of tempering the glass.

DETAILED DESCRIPTION OF PREFERRED EMBODIMENT OF THE INVENTION

The following detailed description refers to the accompanying drawings, which illustrate specific embodiments of the invention. Other embodiments having different structures and operation do not depart from the scope of the present invention. Like reference numbers refer to like structures throughout.

Figure 17:
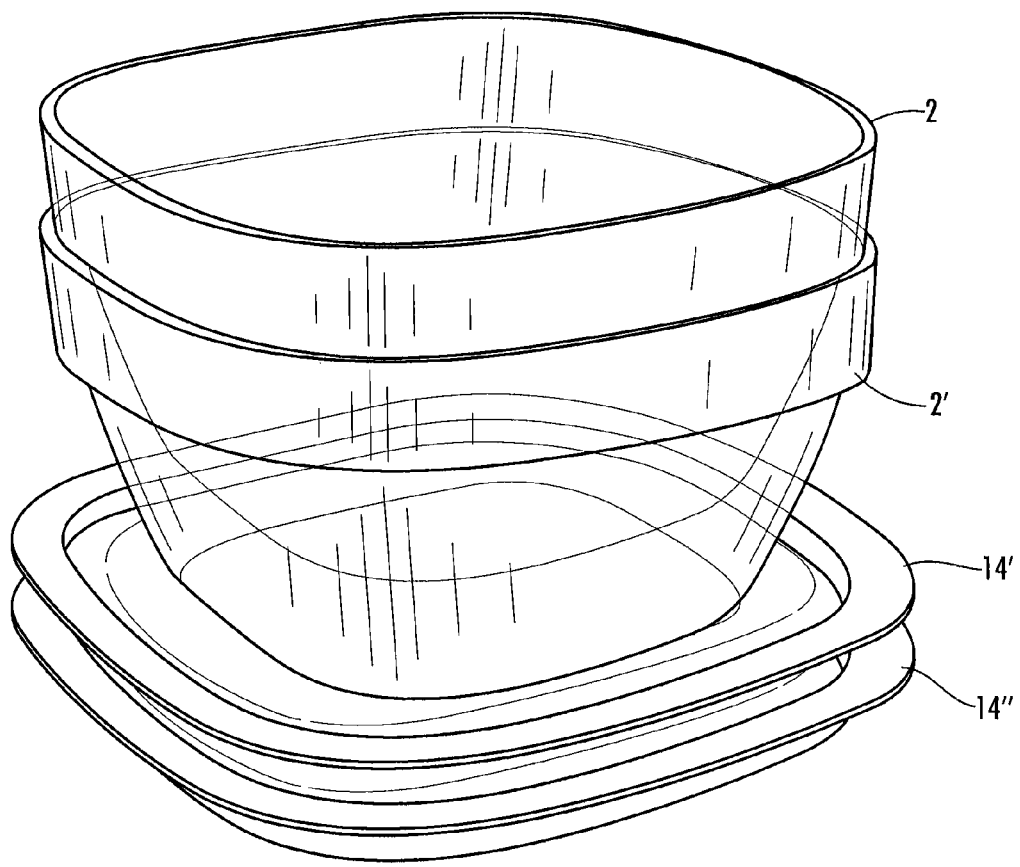
FIG. 17 is a perspective view showing a plurality and containers in a stacked storage arrangement.

Referring to FIGS. 1 through 4, an article made in according to the method of the invention may comprise a container 2 used in a container system such as a dish, bowl or the like having a base 4 and an upwardly extending wall 6 that terminates in a top edge 8 that defines an open upwardly extending mouth 10. Mouth 10 allows access to the interior 12 of storage compartment 2 such that a user can store a product in the container 2. The container 2 has a relatively thin wall structure and is made of molded glass. In the illustrated embodiment the container 2 is transparent although the container may be made opaque such as of colored glass. The container 2 may be made in a variety of sizes where like size or smaller size containers may nest inside of the larger size containers to provide convenient space-saving storage as shown in FIG. 17.

Figure 1:
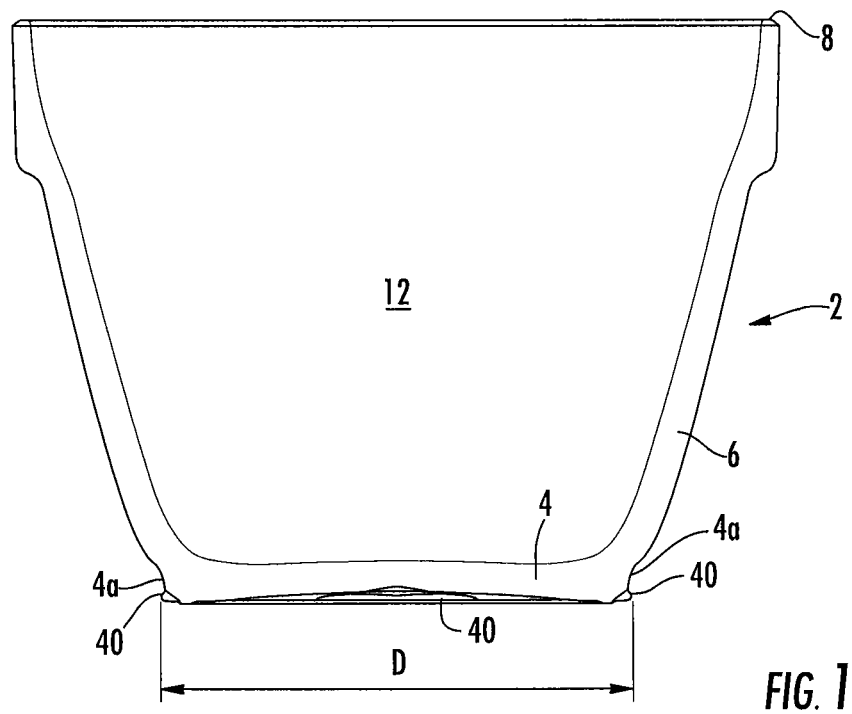
FIG. 1 is a side view of an embodiment of an article such as a container made by the method of the invention.
Figure 2:
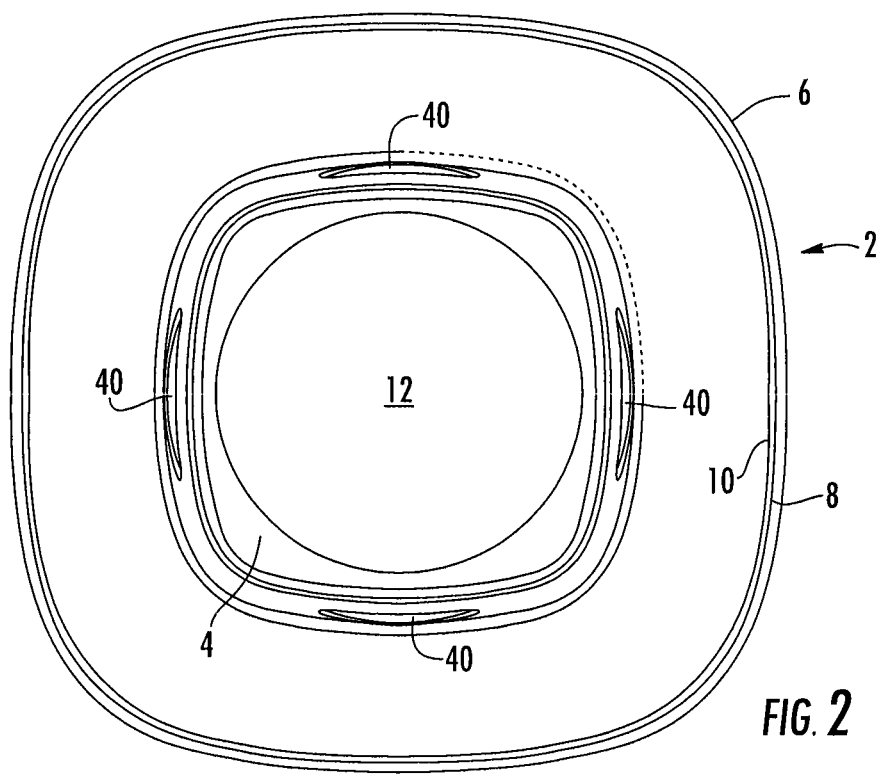
FIG. 2 is a top view of the container of FIG. 1.
Figure 3:
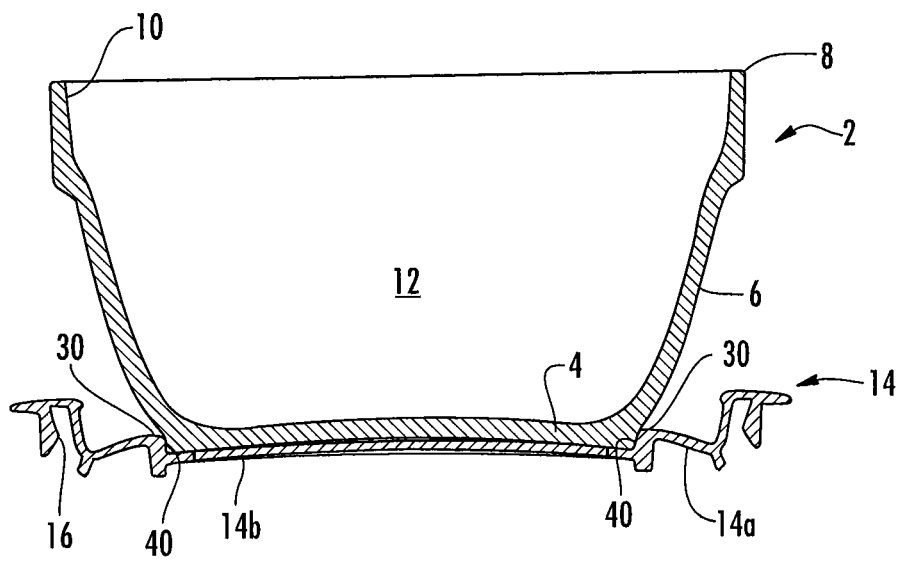
FIG. 3 is a section view of the container of FIG. 1 connected to a lid.
Figure 4:
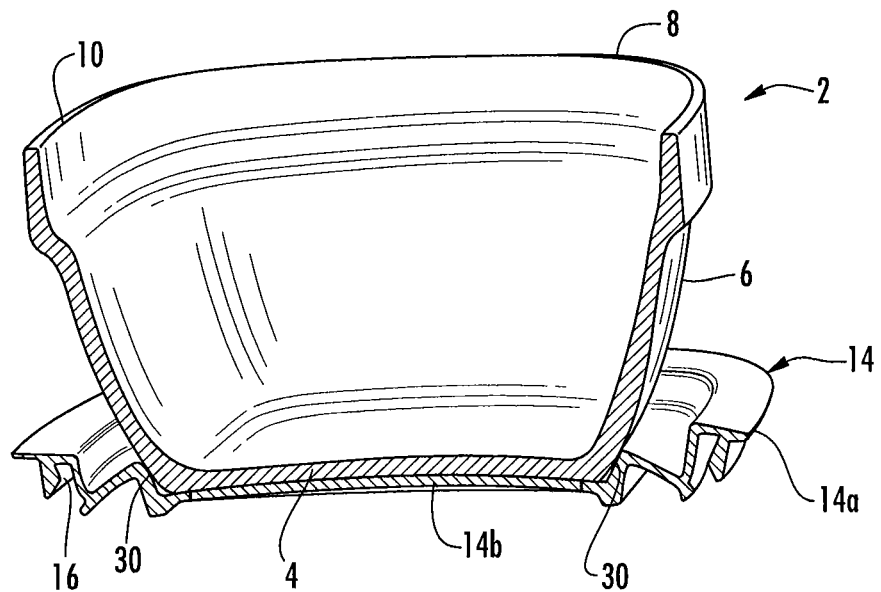
FIG. 4 is a perspective view of the section view of FIG. 3.
Figure 5:
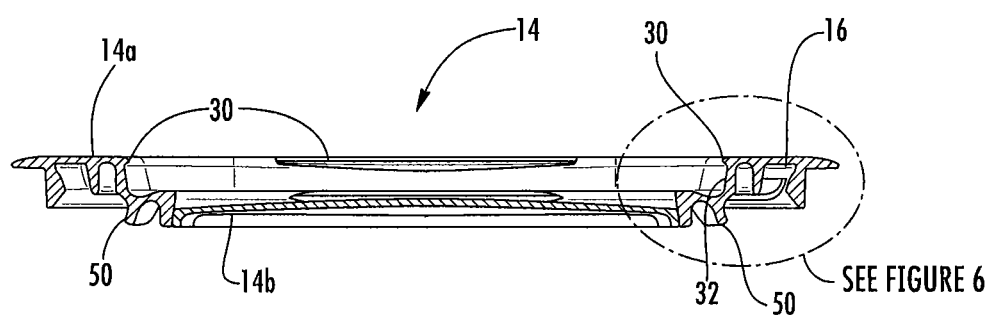
FIG. 5 is a section view of an embodiment of the lid of the invention.
Figure 6:
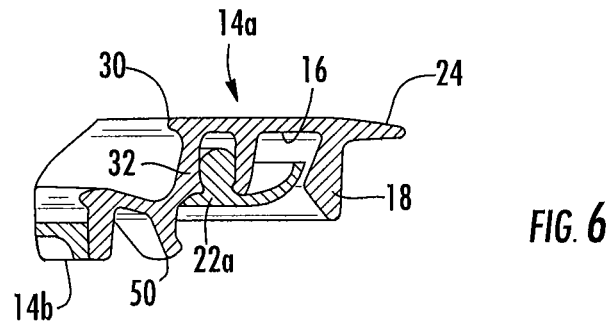
FIG. 6 is a detailed view of the lid of FIG. 5.
Figure 7:
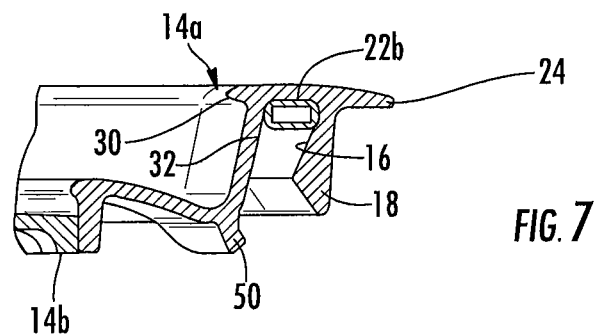
FIGS. 7 through 10 are detailed views similar to FIG. 5 showing alternate embodiments of the lid.
Figure 8:
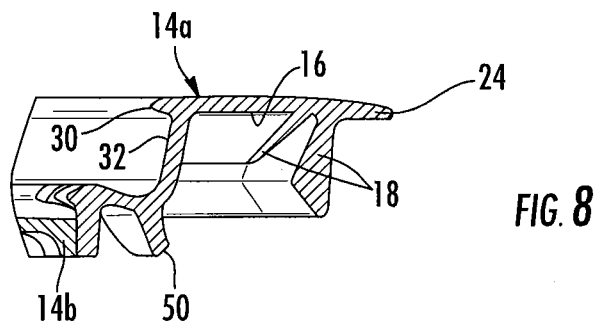
Figure 9:
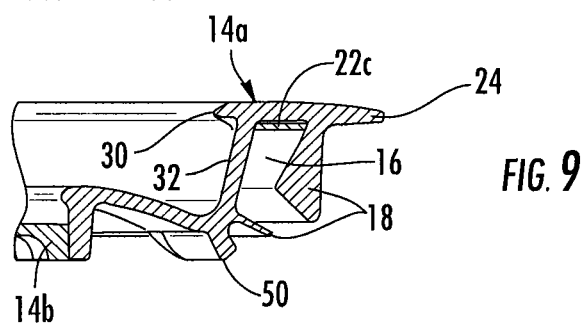
Figure 10:
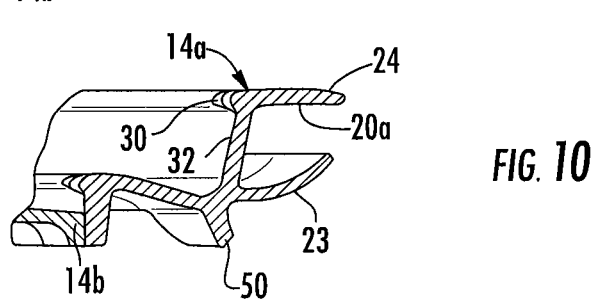

Referring to FIGS. 3 and 4 a lid 14 for the container 2 is made of molded plastic rim portion 14a that may be secured to a transparent rigid center portion 14b. The rim portion 14a is flexible such that it can be snap fit over the top edge 8 of the container 2 to close and seal the container. The rim portion 14a comprises a downwardly facing channel 16 that is coextensive with the top edge 8 of container 2 such that the top edge 8 is received in channel 16 when the lid 14 is secured to the mating sized container 2.

Referring to FIGS. 1 through 4, the base 4 of the glass container 2 is formed with a protuberance or series of protuberances 40 that are dimensioned and located to engage the lips 30 on the top of the lid 14 to secure the lid 14 to the bottom of the container 2. In the illustrated embodiment the base 4 and the side wall 6 of the container 2 have a rectilinear shape such that one protuberance 40 is formed along each side of the base 4. The base 4 may have other configurations such as circular where a series of protuberances 40 are spaced about the periphery of the base. The protuberance may also be formed as a single protuberance that extends about the entire periphery of the base 4.

In order to be able to engage the lips 30 the protuberances 40 must extend beyond the wall portion 4a of the base 4 a predetermined distance to provide sufficient surface area against which the lips 30 can bear. In one embodiment the protuberance 40 extends beyond the wall portion 4a less than 1 mm and approximately 0.25 mm. The extent the protuberance 40 extends beyond the wall 4a is limited by the manufacturing tolerances associated with molding a glass article having an undercut portion as described herein. Described herein is a method of making a glass article having undercut protuberances.

Figure 11:
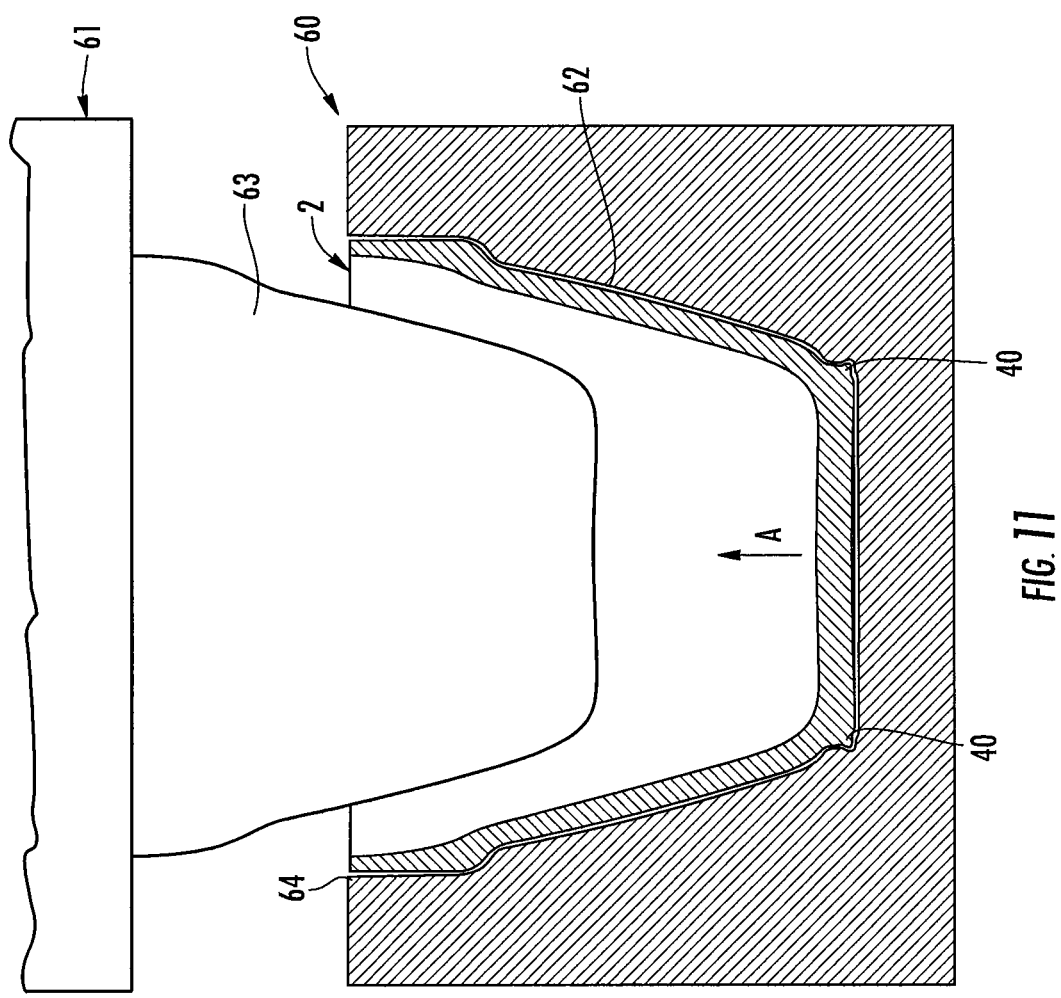
FIG. 11 is a section view of the mold and container illustrating a method of making the container.

Referring to FIG. 11 a glass container 2 is shown in a mold 60 where the mold comprises an interior wall 62 that defines a mold cavity and forms the shape of the exterior surface of container 2. While the article 2 is described herein as a container the method of the invention may be used to make any molded glass article having undercut protuberances formed at a spaced location from the top edge of the mold. A plunger 61 has an exterior wall 63 that forms the shape of the interior surface of container 2. The plunger 61 is movable between a first extended position where it is positioned inside of the mold 60 and completes the mold cavity with the mold 60 and a second retracted position where it is removed from the mold 60 to allow molten glass to be deposited in the mold 60 and to allow the molded article to be removed from the mold. The plunger 61 moves in a linear direction relative to the mold between the first and second positions. The plunger 61 also forces or jams the molten glass into the mold cavity to completely fill the mold cavity as it moves between the retracted position and the extended position.

Figure 12:
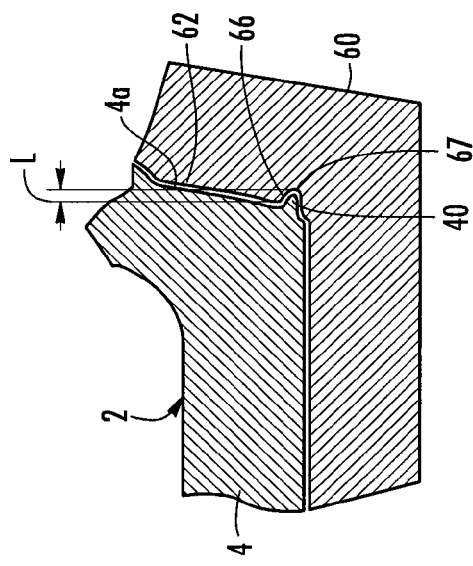
FIG. 12 is a detailed view showing a portion of the container in the mold.

It is to be understood that in glass molding operations the mold 60 and plunger 61 are one-piece structures. The article is removed from the mold by retracting the plunger 61 from the mold 60. The mold 60 is not otherwise disassembled to remove the molded glass article from the mold. The molded glass article 2 is removed in an upward linear fashion from the mold 60 through opening 64 as represented by arrow A. One problem with a molded glass article is that any protuberance formed near the bottom of a molded glass article or formed in a position where the protrusion extends beyond the portion of the article located above the protuberance in the mold cannot be easily removed from the mold 60 because the molded glass protuberance will tend to strike the undercut area of the mold causing the glass article to fracture or chip. Referring to FIG. 12 the protuberance 40 is formed by creating an undercut area 66 in the side wall 62 of the mold 60. The undercut area 66 is created by a recess 67 formed in the wall 62. During molding of the article the glass is forced into the recess 67 to create the protuberance 40 where the protuberance 40 extends beyond the wall 4a of the base. As a result, the protuberance 40 will tend to strike the undercut area 66 of the mold when the molded article is removed from the mold 60 resulting in damage to the glass article such as chipping or fracture. Moreover, such breakage may interrupt the molding operation because any small pieces of glass left in the mold must be completely removed from the mold prior to making the next article.

Figure 15:
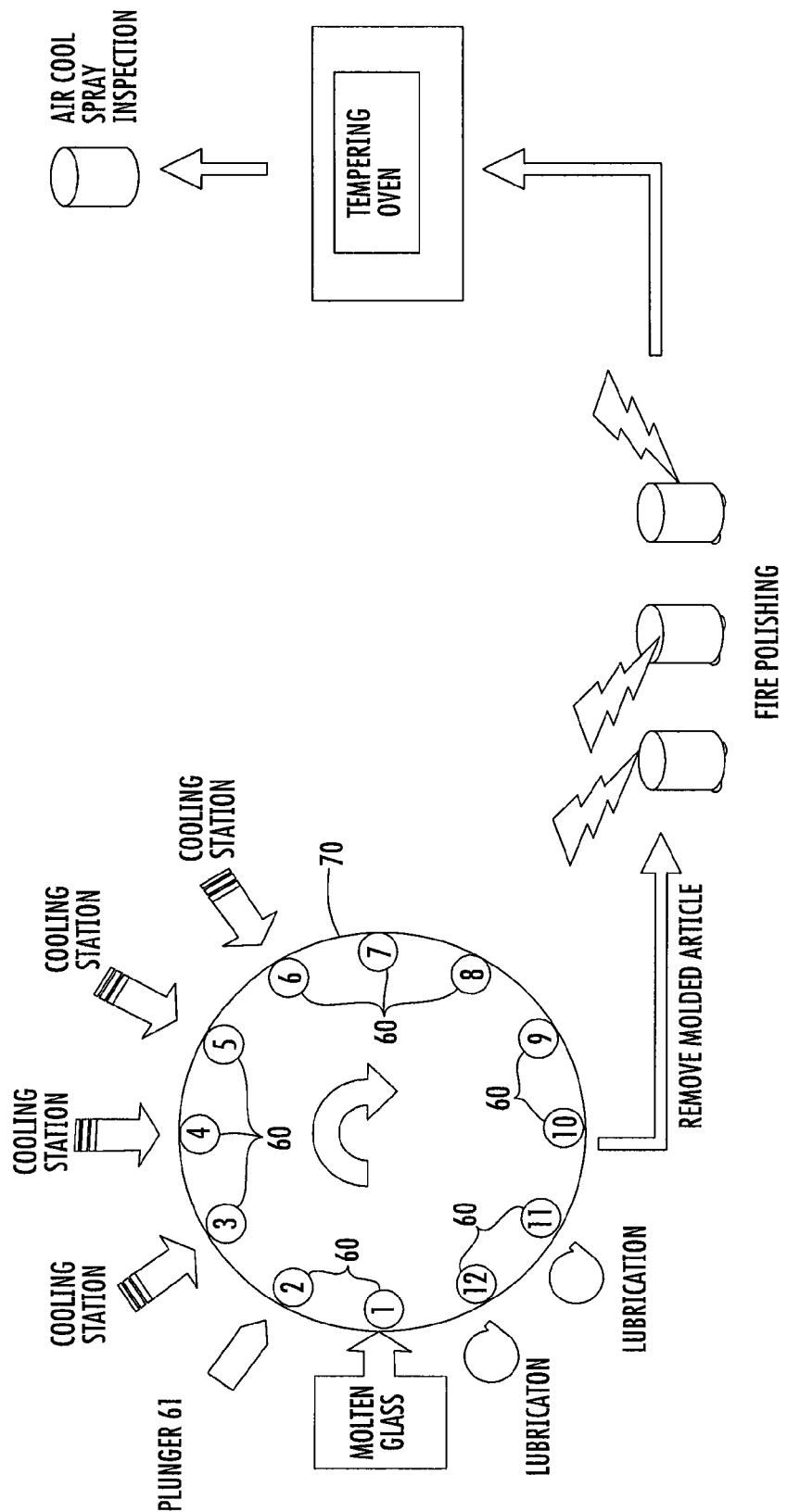
FIG. 15 is a schematic view showing the manufacturing process for the container of the invention.
Figure 16:
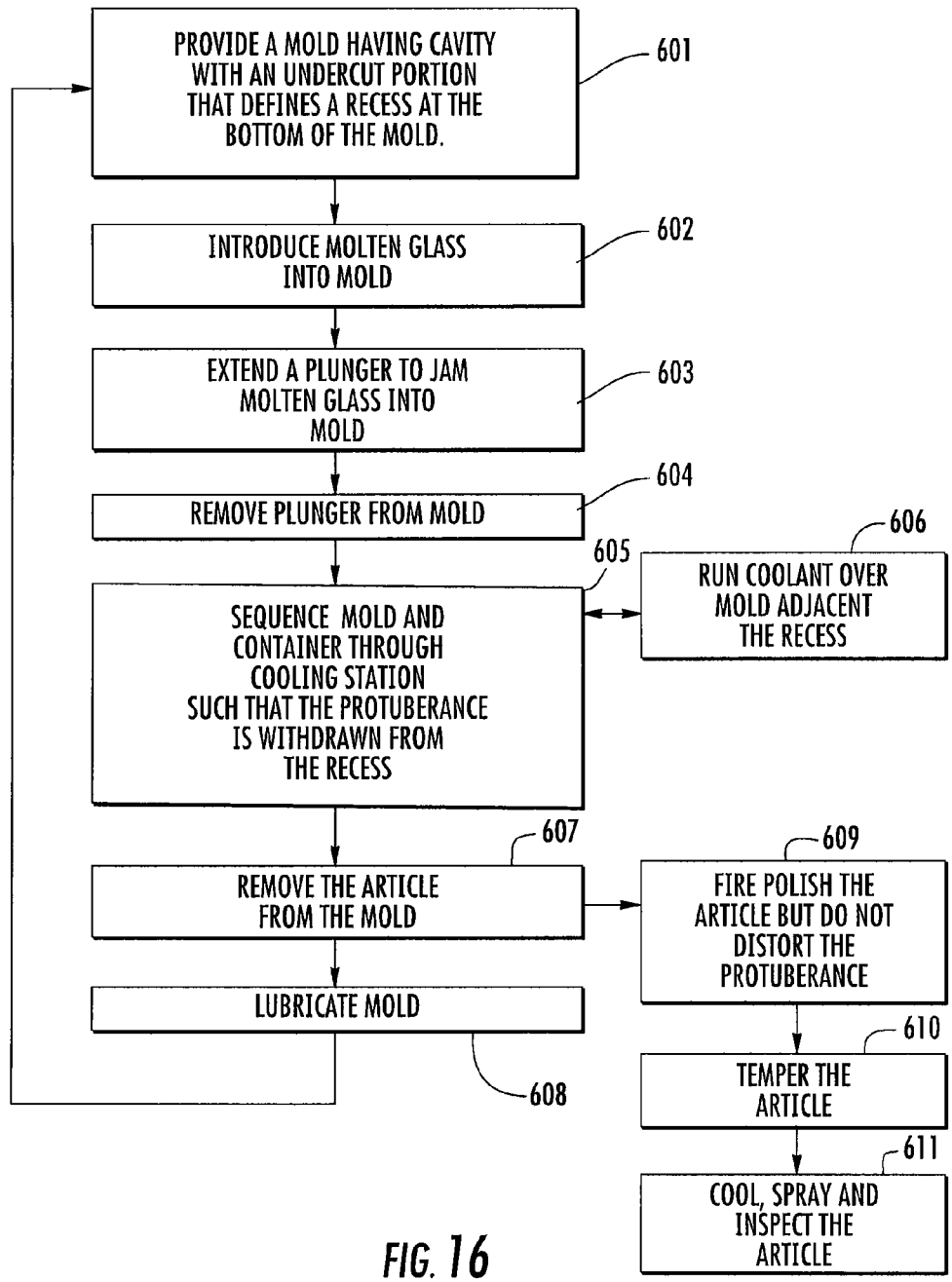
FIG. 16 is a block diagram illustrating an embodiment of a method of making the container.

In order to avoid breaking the article yet still provide a glass article 2 that has protuberances 40 on the base 4, the manufacturing process of the invention has been developed. FIG. 15 illustrates an embodiment of a manufacturing process of the invention and shows a rotatable table 70 having twelve stations, Stations 1-12, where each station comprises a mold 60. The table 70 is indexed to move the molds 60 sequentially through the stations. To create a molded glass article, a mold is provided having a mold cavity defining a container having a base at a bottom of the mold cavity where the mold cavity comprises an undercut portion that defines a recess in the mold cavity (Block 601). The undercut portion is disposed toward the bottom of the mold and is located spaced from the opening in the mold through which the molded article is removed from the mold such that the protuberance extends beyond the side of the article that is located between the protuberance and the opening 64 above the protuberance in the mold. As a result the protuberance must be removed from the mold through the narrower portion of the mold. A glob of molten glass at approximately 1100° C. is introduced to the mold 60 at Station 1 (Block 602). The plunger 61 is extended to force or jam the molten glass into the mold 60 under pressure at Station 2 (Block 603). The plunger 61 is removed from the mold 60 (Block 604) and the mold and glass article 2 are sequenced through cooling Stations 3-6.

As glass cools it shrinks slightly. The present invention takes advantage of this shrinkage by dimensioning the protuberance 40 such that the length the protuberance that extends beyond the wall portion 4a and accordingly the length L of the undercut portion 66 is selected to be approximately the same or less than the amount of shrinkage of the glass as it cools. As a result, as the glass cools the base 4 and protuberance 40 shrink to the point that the glass protuberance 40 is withdrawn from the recess 67 and the distal end of the protuberance 40 will clear the undercut area 66 when the article 2 is removed from the mold 60 (Block 605). In one embodiment the distance the protuberance 40 extends beyond wall 4a is less than 1 mm and may be approximately 0.25 mm although the absolute amount of shrinkage in linear distance will vary based on the size of the article and the amount of glass in the base 4.

To control the cooling of the molded glass article and to ensure that the base 4 cools sufficiently to obtain the desired shrinkage a plurality of cooling stations, Stations 3 through 6, are provided prior to releasing the article from the mold. The cooling stations run coolant over the mold 60 in the area adjacent to the base 4 to cool the base 4 sufficiently to cause the desired shrinkage (Block 606). The coolant may comprise air, water or other coolant blown or sprayed over and/or through the mold adjacent to at least the base 4 of the article 2. After the cooling stations the table 70 indexes the mold 60 and article 2 to Station 10 where the article 2 is removed from the mold 60 (Block 607).

Figure 13:
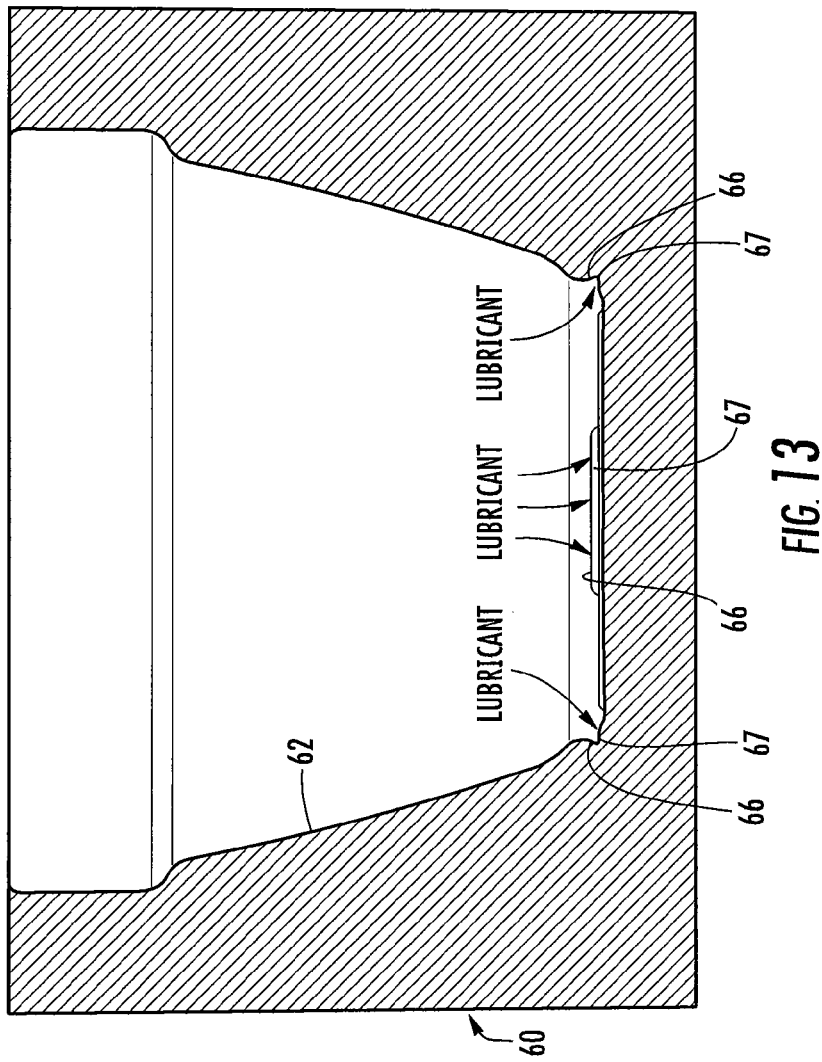
FIGS. 13 and 14 are section views of the mold illustrating manufacturing steps of the container.

Even with the appropriate cooling and shrinking, the tolerances necessary to make the protuberances work properly with the lid are very small. Because the protuberance extends for approximately 1 mm or less, the total dimension D (FIG. 1) of the base 4 between the distal ends of protuberances 40 must be maintained to within ±0.5 mm. Therefore, even with very small tolerances on the mold and controlling the cooling of the base, the possibility exists that the mold in the area of the undercut portion 66 may interfere slightly with the protuberance 40 when the glass article 2 is removed from the mold. Accordingly, as shown in FIG. 13, before each glass injection cycle the mold is lubricated at Stations 11 and 12 such that the in the area of the undercut portion 66 the mold is completely lubricated prior to the introduction of the molten glass at Station 1 (Block 608). The lubricant allows the protuberance 40 to slide past the undercut portion 66 even if there is a small amount of interference between the protuberance 40 and the area of the mold in the area of the undercut portion 66.

Figure 14:
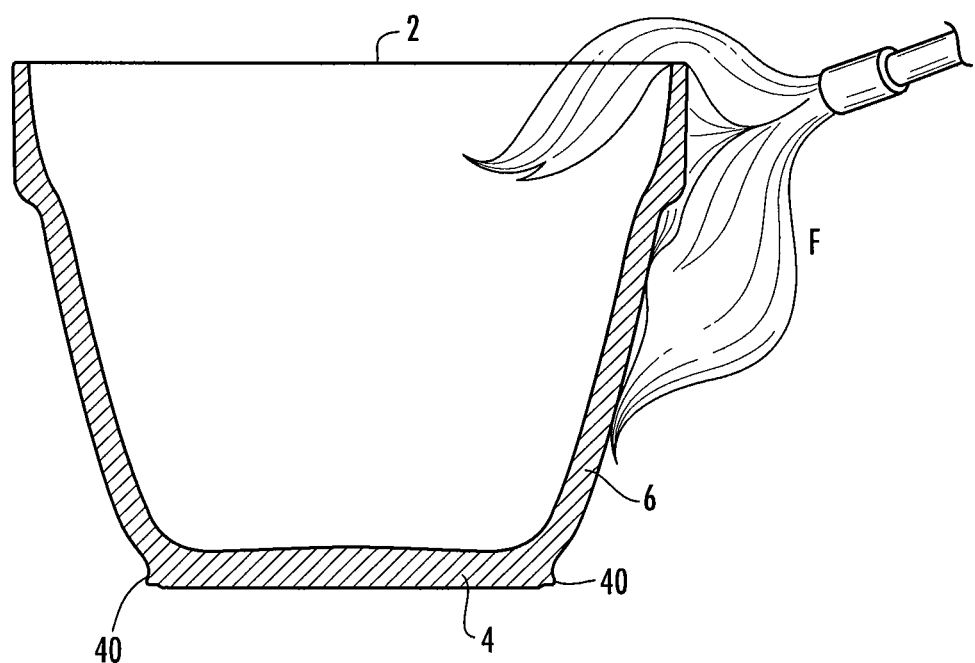

Finally, because the dimension D of the base may have a small tolerance in order to be able to attach to the lids 14, a fire polishing or flame treatment step of the glass molded article to smooth the finish of the article 2 is provided such that the protuberances are not distorted during the flame treatment step. For example, as shown in FIG. 14, the flame F is directed toward the upper portions of sides 6 sides and the interior surface of the article 2 but is not directed at the base 4 so as to not distort the protuberances 40 (Block 609). As a result the fire polishing step does not affect the overall dimension D of the base or the dimension of the protuberances 40.

The polished articles 2 may then be introduced to a tempering oven 72 where the glass is tempered as is known (Block 610). The heat tempered articles may then be air cooled, sprayed with a food safe spray and inspected (Block 611).

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. A method of making a glass container comprising:
providing a mold having a single piece mold cavity defining a container having a base and a side wall formed integrally with the base at a bottom of the mold cavity where the mold cavity comprises an undercut portion that defines a recess in the mold cavity;
introducing molten glass to the mold such that the glass fills the undercut portion to create a protuberance on the base that extends beyond the side wall;
cooling the glass to cause the glass to shrink a sufficient amount that the protuberance recedes from the recess;

removing the container from the mold in a linear direction transverse to the recess;

flame treating the article without flame treating the protuberance whereby the protuberance extends beyond the side wall a distance less than 1 mm.

2. The method of claim 1 further comprising the step of lubricating the mold cavity before each step of introducing molten glass.

3. The method of claim 1 wherein the distance the protuberance extends beyond the side wall is approximately 0.25 mm.

4. The method of claim 1 wherein the step of cooling comprises running coolant over the mold in the area adjacent to the base and protuberance.

5. The method of claim 4 wherein the coolant comprises air.

6. The method of claim 4 wherein the coolant comprises water.

7. The method of claim 1 wherein the step of cooling comprises cooling the interior of the article.

8. The method of claim 1 further comprising the step of tempering the glass.

9. The method of claim 1 wherein the container has a thin walled construction.

10. The method of claim 1 further comprising filling a second undercut portion to create a second protuberance on the exterior of the base.

11. The method of claim 10 forming the base in a rectilinear shape having a plurality of sides and forming the protuberance on one of the plurality of sides and forming the second protuberance on a second one of the plurality of sides.

12. The method of claim 1 wherein the step of introducing molten glass comprises forcing the molten glass into the mold cavity with a plunger.

13. The method of claim 12 further retracting the plunger from the mold cavity prior to cooling the glass.

* * * * *